United States Patent
Ruell

4,014,602
Mar. 29, 1977

[54] IDENTIFICATION CARD HAVING A HOLOGRAM SUPERIMPOSED ON PRINTED DATA

[75] Inventor: Hartwig Ruell, Otterfing, Germany

[73] Assignee: Siemens Aktiengesellschaft, Berlin & Munich, Germany

[22] Filed: Jan. 5, 1976

[21] Appl. No.: 646,842

[30] Foreign Application Priority Data
Jan. 16, 1975 Germany .......................... 2501604

[52] U.S. Cl. .................................. 350/3.5; 40/2.2; 283/7
[51] Int. Cl.² ........................ G03H 1/04; B44F 1/12
[58] Field of Search .................... 350/3.5; 283/6, 7; 40/2.2

[56] References Cited
UNITED STATES PATENTS

| | | | |
|---|---|---|---|
| 3,643,216 | 2/1972 | Greenaway et al. | 350/3.5 |
| 3,647,275 | 3/1972 | Ward | 350/3.5 |
| 3,668,795 | 6/1972 | Barker | 350/3.5 |
| 3,807,859 | 4/1974 | Sugaya et al. | 350/3.5 |

Primary Examiner—Ronald J. Stern
Attorney, Agent, or Firm—Hill, Gross, Simpson, Van Santen, Steadman, Chiara & Simpson

[57] ABSTRACT

A falsification-proof identity card comprises a first transparent layer on the underneath side of which conventional data is applied by printing technology. The card contains a holographic safeguard and additional safety measures such as metal structures, fluorescent structures, safety imprints and the like which are only visible in response to holographic reconstruction and/or other light applications, such as ultra-violet light. The holographic safeguard comprises a second transparent or non-transparent layer which carries on the entire surface which faces the first layer a phase hologram or an amplitude hologram which can be read out by light transmission or by light reflection, depending on the transparency of the layer, and which contains at least the visible data printed on the first layer in a direct recording.

26 Claims, 4 Drawing Figures

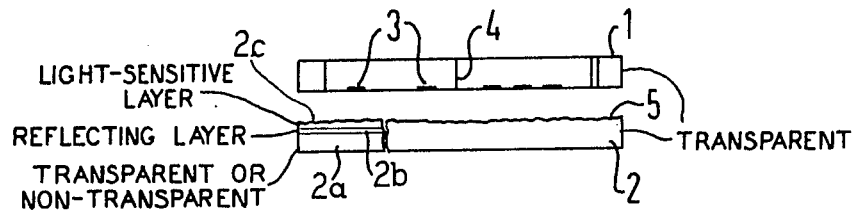
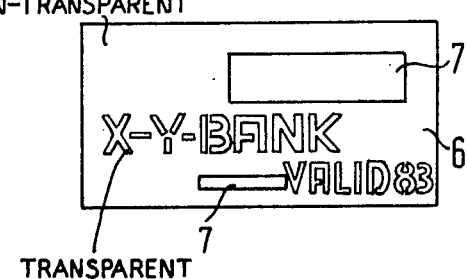
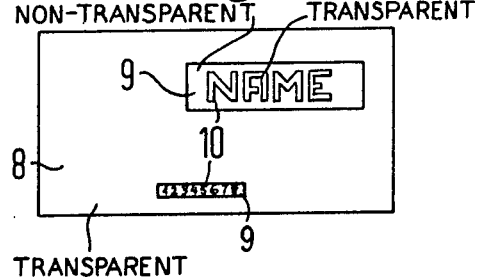
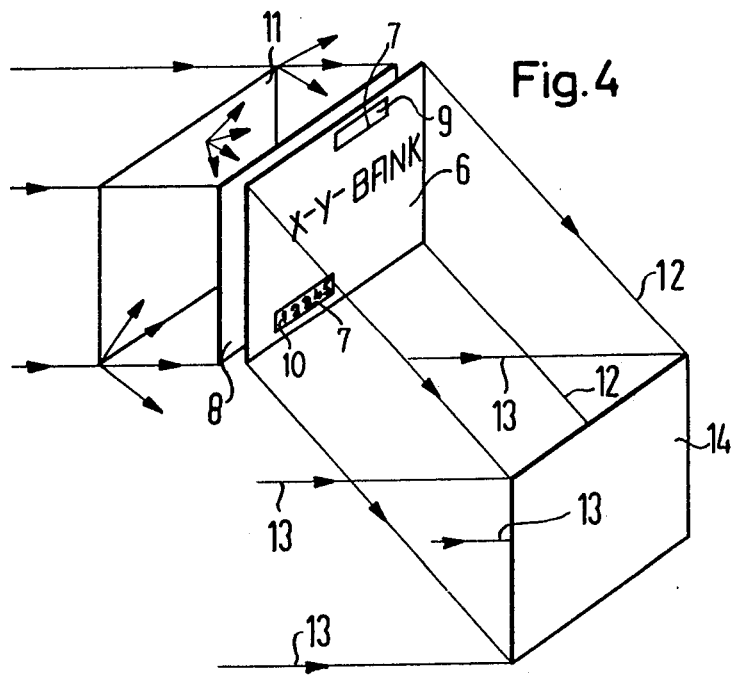

4,014,602

IDENTIFICATION CARD HAVING A HOLOGRAM SUPERIMPOSED ON PRINTED DATA

BACKGROUND OF THE INVENTION

1. Field of the Invention

The present invention relates to a falsification-proof identity card, consisting of a first transparent layer to the underneath surface of which are applied conventional data by printing technology, and which contains a holographic safeguard, and additional safety measures such as metal structures, fluorescent structures, safety imprints and the like, and consisting of a second transparent or nontransparent layer.

2. Description of the Prior Art

The increasingly wide-spread use of identity cards, such as credit cards, check cards and the like, has increased the necessity of avoiding counterfeiting or falsification of these cards by unauthorized persons. Also, in the event of the loss or misappropriation of an identity card, it must be ensured that the identity card cannot be used dishonestly should it be found or should an authorized misuse be attempted.

The German Pat. No. 1,939,594 discloses a document card which possesses a window at a specific position having a hologram arranged therein which is provided with a check number in a binary code. The binary code is represented by the presence or the absence of a predetermined light beam at points arranged in a specific pattern, so that when the hologram is illuminated with a suitable read-out beam, the pattern is reconstructed as an image and with the aid of a decoder provided with light sensing elements for the points of the pattern the binary code is decoded as a check number.

This known document card does not provide a maximum freedom from interference as when the hologram, which occupies only a small position, suffers damage it no longer ensures a reliable decoding of the check number contained therein. In addition, the card is not optimally falsification-proof, as it is possible to punch out the hologram, apply a new hologram, and thus input an arbitrary other check number, while retaining the other data stored in the document card.

SUMMARY OF THE INVENTION

The object of the present invention is to provide an identity card which is absolutely falsification-proof, which can be used, for example, as a credit card or as a check card, and which can be read out anywhere with the aid of a simple and inexpensive read-out device.

Commencing from an identity card of the type set forth above in the Field of the Invention, for the realization of this object, it is proposed that on the entire surface, facing the first layer, of the second layer is applied a phase hologram or an amplitude hologram which can be read out by transmission or reflection and which contains at least the visually observable data of the first layer in a direct recording.

The data stored in the hologram advantageously corresponds to a negative representation of the visible data of the first layer, and can also contain additional check data which does not become visible until the hologram is reconstructed.

In a preferred exemplary embodiment of the invention, the hologram can be in the form of a reflection hologram which is arranged on a reflective surface, the degree of reflection of the reflective surface varying over the whole of the length or width of the identity card. It is particularly advantageous for the degree of reflection to vary continuously, or in steps, between 0 and 100%.

BRIEF DESCRIPTION OF THE DRAWING

Other objects, features and advantages of the invention, its organization, construction and operation will be best understood from the following detailed description taken in conjunction with the accompanying drawing, on which:

FIG. 1 is a cross-sectional view through an identity card constructed in accordance with the invention;

FIG. 2 is a plan view of a negative required for production of the card illustrated in FIG. 1;

FIG. 3 is a plan view of a mask required, in accordance with the invention, for the production of the identity card illustrated in FIG. 1; and FIG. 4 illustrates the paths of the illuminating, object and reference beams during the recording process.

DESCRIPTION OF THE PREFERRED EMBODIMENTS

An identity card, constructed in accordance with the invention, is schematically illustrated in FIG. 1 as comprising a first transparent layer 1, for example a synthetic foil, and in particular a PVC foil, which has data 3 born on the underneath surface thereof. The data 3 may be applied by conventional printing techniques. The layer 1 can contain additional safety measures 4, such as, for example, inlet metal strips or metal structures, fluorescent structures, which can only be visualized by ultra-violet light, and other safety imprints.

On the surface of a second layer 2, which is adjacent to the imprinted surface of the layer 1, and which can likewise be in the form of a transparent synthetic foil, is applied, in accordance with the invention, a phase or amplitude hologram 5 which contains at least the visible data 3 of the layer 1 in a direct holographic recording, and preferably also additional check information. The layers 1 and 2 may advantageously be welded together, either along the edge, or in accordance with a specific pattern, to produce an inseparable unit, wherein the holographically stored data extends over the entire surface of the identity card. As the size of the hologram equals the size of the identity card, a maximum freedom from interference is achieved during the read-out of the holographically stored data, as even when read-out takes place at a disturbed point, the identity card can be shifted so that the read-out beam hits a different area, or the beam can be expanded to illuminate the entire hologram so that the holographically stored data can, in any case, be regained with adequate contrast.

It is impossible to exchange or to falsify the holographically stored data as the two layers 1 and 2 are inseparably welded to each other, and it would be necessary to falsify the entire identity card as a whole, thus with all the other safety measures, which would necessitate a considerably high level of technology.

The hologram 5 can, for example, be an amplitude hologram or a phase hologram and can be read out either by transmission or by reflection. If the hologram is to be read out by transmission, the two layers 1 and 2 are designed to be transparent. If the hologram is to be read out by reflection, a reflective surface is applied to the layer 2, the layer 2 then no longer requiring transparency, and a light sensitive layer is applied to the reflective surface for holographic recording.

In order to be able to additionally read out the other safety measures, such as the metal structures and the fluorescent structures 4 during read-out, the degree of reflection increases either continuously, or in steps, from 0 to 100% from one edge of the identity card to the opposite edge. Therefore, in the vicinity of the edge possessing a 0% degree of reflection, the identity card can also be irradiated with ultra-violet light, whereas the holographic data is read out at the points at which the degree of reflection is sufficiently high.

The large hologram surface provides that the positioning of the identity card during read-out is entirely non-problematic, as it is not important which point of the identity card is hit by the read-out beam.

In order to achieve the highest possible contrast during the reproduction of the holographically stored data, in the hologram recording the object is preferably stored by the transmission method where the structures which are to be holographically recorded, such as letters, digits, graphic safety devices, etc., are transparent, all other points of the object lay-out, however, are non-transparent.

As in most cases the data which is to be stored is composed of an unchanging component which is the same on all cards, such as, e.g., the names of organizations, period of validity, graphic safeguards, etc. and also of statements which vary from card to card, e.g., name, date of birth, account numbers of card bearers, etc., for production reasons it is advisable to produce the lay-outs for the unchanging data and for the data which is specific to the bearer in two separate steps. The lay-out for the unchanging data is preferably produced by a contact copy (FIG. 2) of the transparent top layer 1 having the permanent data printed thereon. In this step, one or a plurality of transparent windows 7 are made on the negative 6, through which windows the data which is specific to the bearer is inserted prior to the holographic storage process.

This data which is specific to the bearer is generally obtained in decentralized branch offices. Therefore, it would be desirable to provide that, together with the usual administrative registration work, a lay-out suitable for the holographic recording process and provided with the data specific to the bearer be produced in these branch offices. To achieve this, it is proposed that a transparent synthetic foil be provided with a special layer 8 which is impermeable to light, at the points 9 which coincide with the windows 7 of the contact copy 6. A typewriter, or another printing machine, can then be used to cut out the desired letters 10, for example name, birth data, account numbers, etc., from the non-transparent layer 8 so that the data which is specific to the bearer appears in transparent form on a non-transparent background.

In order to holographically store fixed data and data which is specific to the bearer, the negative 6 and the foil 8 are placed against each other, as illustrated in FIG. 4, in such a manner that the points 9 of the transparent synthetic foil 8 come to lie on the windows 7 of the negative 6.

If the foils 8 and 6 are irradiated with a preferably diffused illuminating wave 11, and if the resulting object wave 12 is recorded with a plane reference wave 13 on a light sensitive layer 14, the hologram which is formed contains the fixed information of the negative 6 and of the synthetic foil 8.

Suitable materials for the light sensitive layer on the surface of the layer 2 for the application of the hologram, are either photo lacquers, conventional photographic emulsions, photothermoplastics having a suitably high softening point, or bichromate gelatins. The amplitude or phase holograms 5 can be in the form of a Fraunhofer hologram, a Fresnel hologram or a lensless Fourier transformation hologram.

The read-out of the identity cards constructed in accordance with the invention no longer requires special decoders which must be provided with a plurality of detectors and a complicated analysis electronics system, but it is, in fact, sufficient to use a simple read-out device as the reconstructed holographic data is visually observable.

In order to obtain a real image during reproduction, in the read-out process the hologram is illuminated with a wave which, apart from the opposite direction of propagation, is identical to the reference wave which was used during the holographic recording process. This can be effected in a very simple fashion, retaining the original reference wave, by rotating the hologram in relation to its recording position by 180° about the vertical axis.

An identity card constructed according to the present invention not only possesses the great advantage of being completely falsification-proof, as the two layers 1 and 2 are inseparably welded to one another thus preventing the holographically stored data from being altered in any circumstances, but also possesses the advantage of a maximum freedom from interference, as it is immaterial which point of the identity card is used for the read-out of the holographically stored data—and this feature also renders the positioning of the identity card during the read-out completely nonproblematic.

Although I have described my invention by reference to particular embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:
1. A falsification-proof identity card comprising:
    a transparent first layer being visible printed data on a first surface thereof;
    a second layer connected to said first layer and covering said first surface; and
    a hologram carried by said second layer on a first surface thereof which faces said first surface of said first layer, said hologram covering said entire first surface of said second layer and containing identification data, including at least the visible data of said first layer, and said hologram responsive to light to visibly reconstruct said identification data.
2. The identity card of claim 1, wherein said second layer is transparent for light transmission therethrough for readout.
3. The identity card of claim 1, comprising a light reflecting layer carried on said first surface of said second layer and carrying said hologram for light reflection readout.
4. The identity card of claim 3, wherein said hologram comprises a light-sensitive layer carried on said light reflecting layer.

5. The identity card of claim 1, wherein said hologram comprises data corresponding to a negative representation of said visible data and invisible data which become visible upon hologram reconstruction.

6. The identity card of claim 3, wherein said light reflecting layer includes a reflecting surface which has a degree of reflection ranging between 0 and 100% from one edge of the identity card to the opposite edge.

7. The identity card of claim 6, wherein the degree of reflection is a continuous change across the card.

8. The identity card of claim 6, wherein the degree of reflection is a step-wise change across the card.

9. The identity card of claim 1, wherein said first layer includes polyvinylchloride material.

10. The identity card of claim 1, comprising at least one invisible additional safety structure which is visible only in response to light of a different type than that used for hologram data reconstruction.

11. The identity card of claim 10, wherein said safety structure comprises at least one metal structure.

12. The identity card of claim 10, wherein said additional structure comprises a fluorescent structure.

13. The identity card of claim 10, wherein said additional structure is visible in response to ultra-violet light.

14. The identity card of claim 1, wherein said hologram is an amplitude hologram.

15. The identity card of claim 1, wherein said hologram is a phase hologram.

16. The identity card of claim 1, wherein said hologram is a Fraunhofer hologram.

17. The identity card of claim 1, wherein said hologram is a Fresnel hologram.

18. The identity card of claim 1, wherein said hologram is a lens-less Fourier-transformation hologram.

19. The identity card of claim 1, wherein said hologram comprises a light-sensitive layer supported by said second layer and comprising a material selected from the group consisting of photo lacquers, photographic emulsions, photo thermoplastics having a suitably high melting point and bichromate gelatins.

20. An identification card comprising:
a transparent first layer bearing visible printed data on a first surface thereof identifying a particular organization and identical to that on other like identification cards issued by that organization;
a second layer connected to said first layer and covering said first surface; and
a hologram carried by said second layer on a first surface thereof which faces said first surface of said first layer, said hologram covering said entire first surface of said second layer and containing identification data, including the data of said first layer and data unique to the authorized bearer of the card.

21. A process for making an identity card, comprising the steps of:
printing first data on a surface of a transparent layer;
forming a photo negative with the first data borne thereon as transparent characters and also bearing transparent areas;
forming a mask having second data as transparent characters and also bearing transparent areas;
positioning the negative and mask to register the transparent characters of each with the transparent areas of the other;
illuminating the positioned negative and mask to produce and direct an object wave onto a light-sensitive layer;
directing a reference wave onto the light-sensitive layer to form a hologram of the first and second data; and
superimposing the transparent layer over and connecting it to the exposed light-sensitive layer to produce an identity card on which the printed first data is visible and the holographically stored first and second data are visible upon holographic reconstruction.

22. The process of claim 21, wherein the step of illuminating the negative and mask is further defined as illuminating the negative and mask with a diffused wave.

23. The process of claim 21, wherein the step of directing a reference wave is further defined as directing a plane reference wave onto the light-sensitive layer.

24. The process of claim 21, wherein the step of forming a photo negative is further defined as forming a negative photo contact copy of the printed first layer.

25. The process of claim 21, wherein the step of forming a mask is further defined by the step of cutting transparent characters in an opaque area of a layer.

26. The process of claim 21, comprising the steps of: applying a light reflecting layer to another layer; and applying the light-sensitive layer to the light reflecting layer.

* * * * *